United States Patent [19]
Carroll

[11] Patent Number: 5,090,544
[45] Date of Patent: Feb. 25, 1992

[54] GRAIN DISTRIBUTOR

[76] Inventor: Marshall Carroll, 2060 22 Mile Rd., Sears, Mich. 49679

[21] Appl. No.: 455,547

[22] Filed: Dec. 22, 1989

[51] Int. Cl.⁵ .......................................... B65G 11/20
[52] U.S. Cl. .................................................. 193/31 A
[58] Field of Search ................. 193/2 R, 33, 34, 31 R, 193/31 A, 14; 198/360; 222/533, 526

[56] References Cited

U.S. PATENT DOCUMENTS

| | | | |
|---|---|---|---|
| 877,304 | 1/1908 | Dick | 193/23 |
| 2,699,891 | 1/1955 | Kellicott | 198/360 |
| 2,799,378 | 7/1957 | English . | |
| 2,842,242 | 7/1958 | Patterson | 193/23 |
| 3,383,442 | 5/1968 | Mountain | 222/533 X |
| 3,557,924 | 1/1971 | Schlagel, Jr. . | |
| 3,827,578 | 8/1974 | Hough . | |
| 3,842,992 | 10/1974 | Herold | 193/33 R X |
| 4,007,842 | 2/1977 | Hough . | |
| 4,081,004 | 3/1978 | Harris | 222/533 X |
| 4,174,920 | 11/1979 | Knox | 193/31 A X |
| 4,623,056 | 11/1986 | Flaugher | 193/23 |

Primary Examiner—Joseph E. Valenza
Attorney, Agent, or Firm—Varnum, Riddering, Schmidt & Howlett

[57] ABSTRACT

A grain distributor (10) comprises a sector-shaped housing (12) with a plurality of hoppers (22) secured to the arcuate end of the housing (12) and a plurality of intake spouts (32) directed to the upper end of the housing (12). A plurality of swinging spouts (42) are provided within the housing (12), each swinging spout corresponding to a single intake spout. Each spout (42) is mounted for independent movement within the housing (12) such that a lower end (50) of each spout may be disposed in registration with a hopper (22) while maintaining an upper end (46) in registry with one of the intake spouts (32). Each spout (42) is driven by a rotatable shaft (64) having a slotted nut (74) journaled thereon which is pivotably connected to the spout (42). The shaft (64) is driven by a reversible motor (70). Microswitches (88) are mounted to rails (82) and positioned adjacent each hopper (22) in order to send a signal to a control panel (120) when the spout (42) is in registry with the hopper (22).

21 Claims, 4 Drawing Sheets

GRAIN DISTRIBUTOR

BACKGROUND OF THE INVENTION

1. Field of the Invention

This invention relates to distributors used in grain elevators for distributing grain or similar aggregates to suitable conduits extending to individual storage bins. More particularly, the invention relates to an improved structure for directing material from a multiplicity of sources to a multiplicity of destinations, either independently or combining the various materials into mixture.

2. Description of the Prior Art

In the practice of handling grain following the harvest thereof, the grain is typically transported from the farm to nearby elevators for temporary storage. The elevator has a multiplicity of storage bins within a single building over which is mounted a cupola containing a grain distributing mechanism. Grain is elevated to the cupola by a conveying system which connects with a distributor located in the cupola. The distributor serves to direct grain to one or more of the storage bins.

Grain distributors are generally well known in the art, the most recent improvements being in self-contained distributors designed to control grain dust. Among self-contained distributors are sector-shaped distributors of the type disclosed in U.S. Pat. No. 2,842,242 issued to Patterson on July 8, 1958, and rotary distributors of the type disclosed in U.S. Pat. No. 3,557,924 issued to Schlagel, Jr. on Jan. 26, 1971.

Among the problems with rotary distributors is that they require a great deal of head space within an elevator which gives rise to added costs in construction. Also, difficulties are presented using a rotary design and providing a mixture of materials from multiple inlets to a single outlet.

Sector-shaped distributors with swingable spouts address the matter of conservation of head space within an elevator, but have heretofore have not been able to satisfactorily facilitate the mixing of materials from multiple inlets to a single outlet or alternatively direct grain from multiple inlets to multiple separate outlets.

SUMMARY OF THE INVENTION

By the present invention, a grain distributor has a plurality of outlet openings in the lower arcuate periphery of a sector shaped housing. Two or more inlet openings are provided in an upper portion of the housing to receive granular material. The distributor also has two or more spouts, each having an open upper end and an open lower end mounted within the housing. Means are provided for independently mounting each spout within the housing for swinging movement of the respective lower ends for registration with each of the outlet openings while maintaining each open upper end in registry with one of the inlet openings. Thus, granular material received in a respective inlet opening may be directed to a preselected outlet opening.

The grain distributor can include two or more driving means mounted within the housing and coupled to the spouts for moving the lower ends independently of each other with relative to the outlet openings. Preferably, the driving means comprises a rotatable shaft connected to a reversible motor and a connecting means interconnecting the shaft and one of the spouts. The connecting means is adapted to move the spout axially relative to the shaft when the shaft rotates.

Typically, the shaft is threaded, and the connection means comprise a nut threaded on the shaft with means for slidably mounting the nut to the spout. The mounting means can comprise a circular plate fixed to the nut and a pair of brackets mounted to the respective spout. Each bracket defines a channel longitudinal of the spout to receive the periphery of the circular plate so that the plate can rotate and slide longitudinally relative to the spout.

The nut preferably has a means forming a pair of opposed axially extending edges transverse to the threads on the shaft to remove debris accumulated on the shaft when the shaft rotates relative to the nut.

The grain distributor preferably further comprises means to indicate when the lower end of a spout is in registry with an outlet opening. The indicator means comprises a switch means mounted within the housing and adapted to be actuated by a an actuating means on a lower ends of the spouts when the lower ends are in registry with the outlet openings. Preferably, the switch means is a microswitch with a biased lever pivotably mounted thereto so that the actuating means will move the lever when the lower end is in registry. The lever may have a roller on the end to facilitate smooth rolling engagement with the actuating means.

BRIEF DESCRIPTION OF THE DRAWINGS

The invention will now be described with reference to the accompanying drawings in which.

DETAILED DESCRIPTION OF THE DRAWINGS

Figure 1:
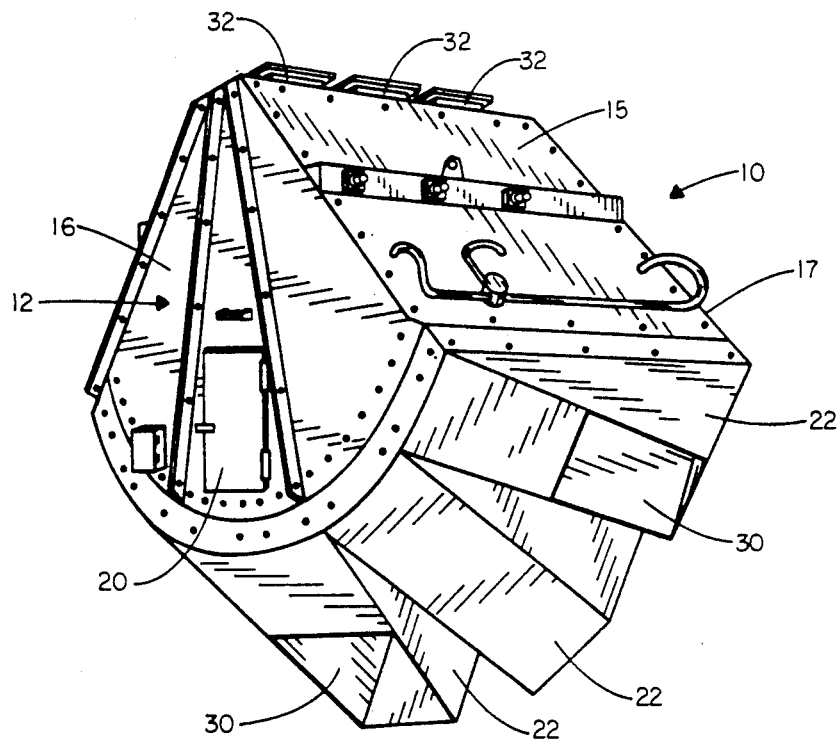
FIG. 1 is a perspective view of a grain distributor according to the present invention.
Figure 2:
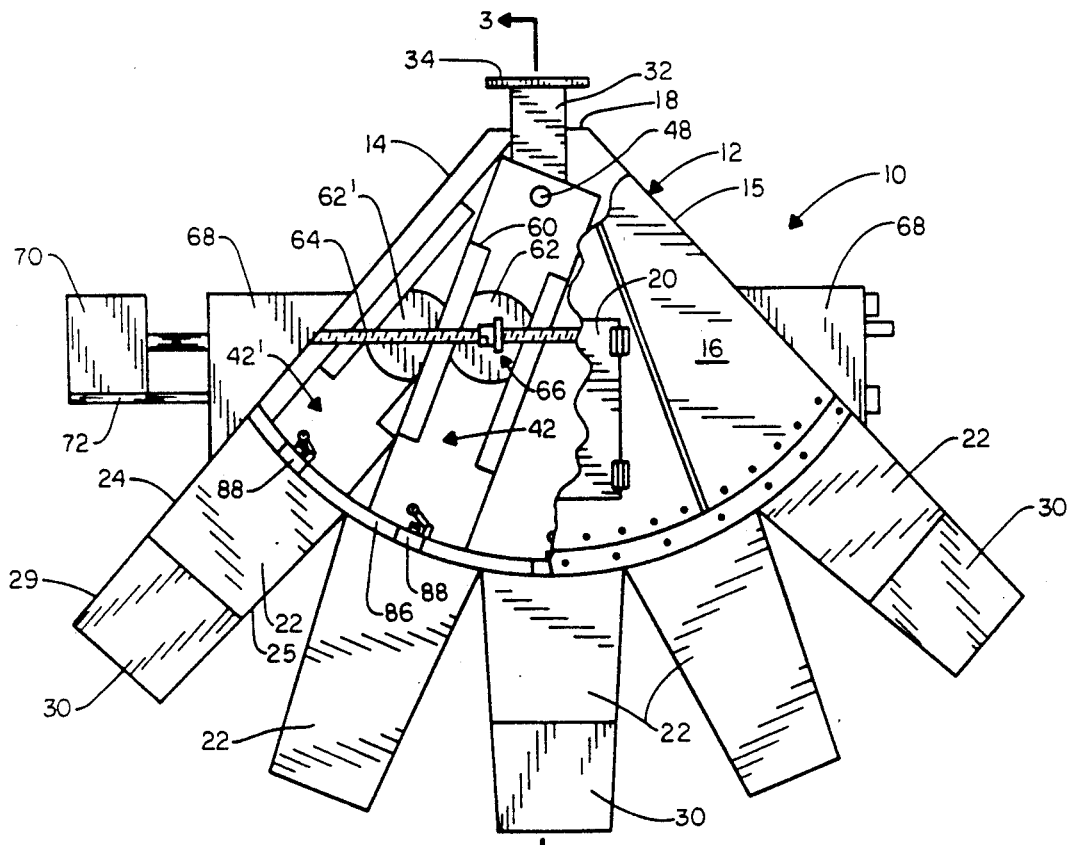
FIG. 2 is an elevational view of the grain distributor of FIG. 1 with a portion of the housing broken away to show the relationship of internal construction.
Figure 3:
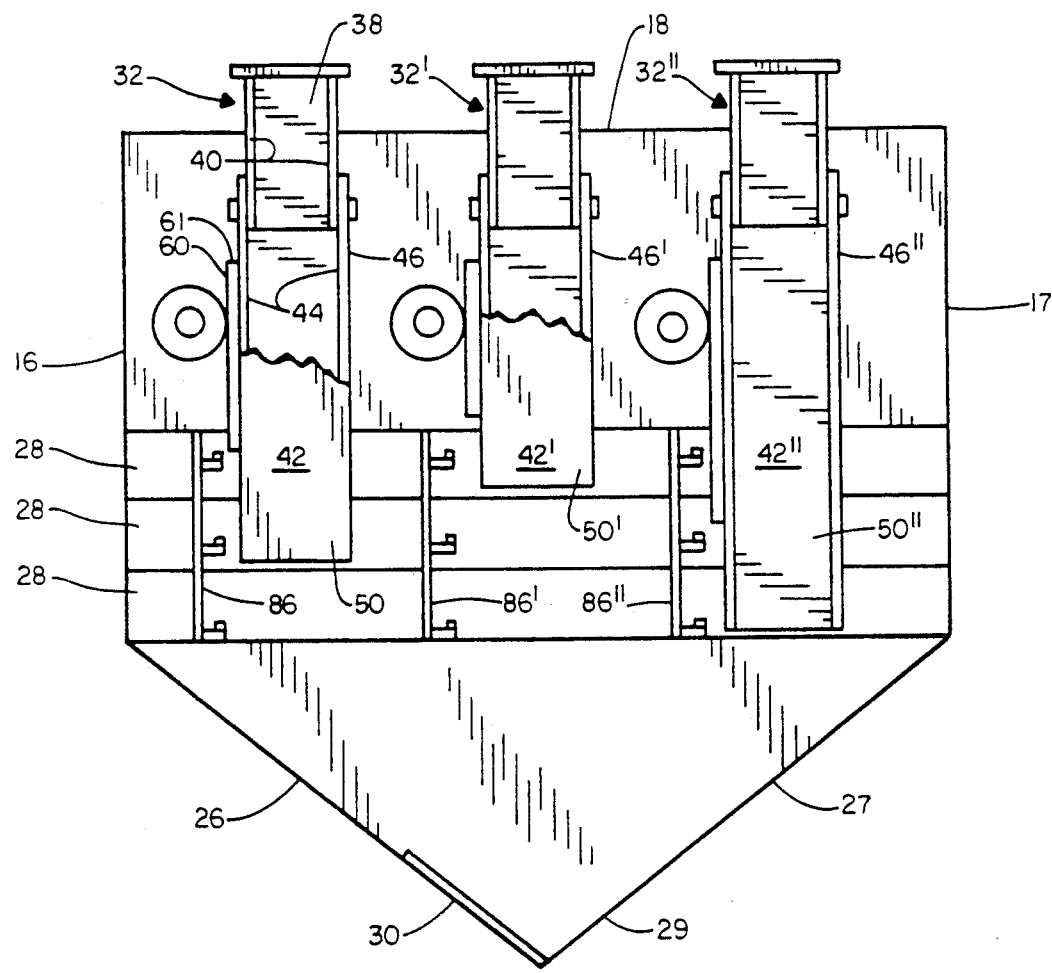
FIG. 3 is a sectional view taken along lines 3—3 of FIG. 2.

Referring first to FIGS. 1 through 3, reference numeral 10 indicates the improved grain distributor forming the present invention. The distributor 10 comprises generally a sector shaped housing 12 formed of vertically sloping end plates 14, 15, and sector-shaped side plates 16, 17 joined thereto. A top plate 18 is connected to the side plates 16, 17 and end plates 14, 15 at a frustum of the sector shape. A door 20 may be provided on one of the side plates 16, 17 to provide access to the interior of the housing 12.

Secured to the arcuate end of the housing 12 are a plurality of hoppers 22. Each hopper comprises a pair of oppositely disposed triangular side plates 24, 25 each joined to sloping end plates 26, 27. Each hopper 22 thus provides an outlet opening 28 adjacent to the arcuate end and which is in communication with the interior of the housing 12. A discharge opening 30 is provided near the lower end 29 of each hopper 22. Each discharge opening 30 is adapted to mount a conduit (not shown) in registry which extends to an individual grain bin of a elevator construction (not shown).

It will be apparent that any number of hoppers may be provided on the housing depending on the number of bins to which material is to be directed. In the embodiment illustrated herein, five hoppers are provided, which for convenience may be numbered one through five. Preferably, the discharge openings 30 are provided on alternate end plates 26, 27 of adjacent hoppers 22 so that material may be directed to both sides of the distributor 10.

Extending through the top plate 18 into the interior of the housing 12 is an intake spout 32. The spout 32 may be secured to the top plate 18 by any conventional means as by welding. A flange 34 is provided around the exterior end of the intake spout 32 for communication with a grain distribution mechanism (not shown), by which grain or other granular material may be delivered to the distributor 10. It will readily be seen in FIG. 3 that a plurality of intake spouts 32, 32', 32" are provided in the top plate 18, each of which can be independently connected to a separate grain or material inlet. At a lower end 38 of each intake spout 32 is provided an aperture 40 extending transversely through the walls of the spout 32.

Referring now more particularly to the internal construction illustrated in FIGS. 2 and 3, a swinging spout 42, 42', 42" depends from each intake spout 32, 32', 32", respectively, in the interior of the housing 12. Each spout comprises opposing side walls 44 and the upper end 46 of each spout 42, 42', 42" is connected to the respective lower end 38 of each intake spout at pivot 48. The lower end 50 of each swinging spout 42 terminates adjacent the hopper openings 28.

Figure 4:
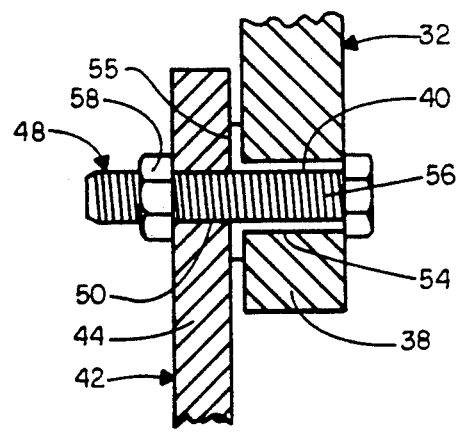
FIG. 4 is a detailed view of the pivot mechanism.

The pivot 48 is best illustrated in FIG. 4 wherein an aperture 52 in one of two opposing side walls 44 of the swinging spout 42 is adapted to align in registry with a corresponding aperture 40 on the lower end 38 of each intake spout 32. A bronze bushing 54 is provided within each aperture 40 on the intake spout 32 and has a wear flange 55 to provide a wearing surface for the swinging spout 42. A shoulder bolt 56 extends through the apertures 40 and 52 and is secured in place by a nut 58. The swinging spout 42 is thus suspended on the bolt 56 and held in pivotable relationship to the intake spout 32. Preferably, the head 59 of the bolt 56 is disposed within the interior of the inlet spout 32.

Referring again to FIGS. 2 and 3, a pair of guide brackets 60 are secured to a side wall 44 of each swinging spout 42. The guide brackets 60 project from the side wall 44 to form a guide channel 61 within which a slide plate 62 is received for sliding movement. The slide plate 62 is preferably circular in shape so that it not only slides longitudinally with respect to the swinging spout, but it may rotate with respect thereto.

It can be seen that each swinging spout 42 is driven in pivotable movement about pivot 48 by means of a rotatable threaded shaft 64 connected to a corresponding spout 42 by a connection means 66. The threaded shaft 64 extends through the housing and is supported at each end by a bearing mount 68 which is mounted to each end plate 14, 15 respectively on the housing 12. The shaft 64 extends through one of the bearing mounts 68 to a reversible motor 70 mounted on a motor mount 72 exterior to the housing 12. The motor 70 rotates the threaded shaft 64 in both directions in response to signals from a controller mechanism 110 (see FIG. 8). A separate motor 70, 70', 70" is associated with each respective spout 42, 42', 42".

Figure 5:
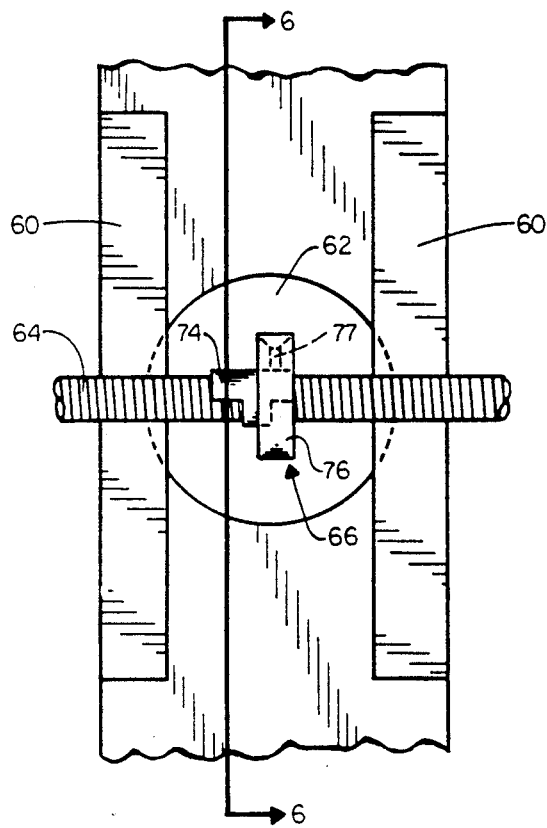
FIG. 5 is a detailed view of the drive mechanism of each swingable spout.
Figure 6:
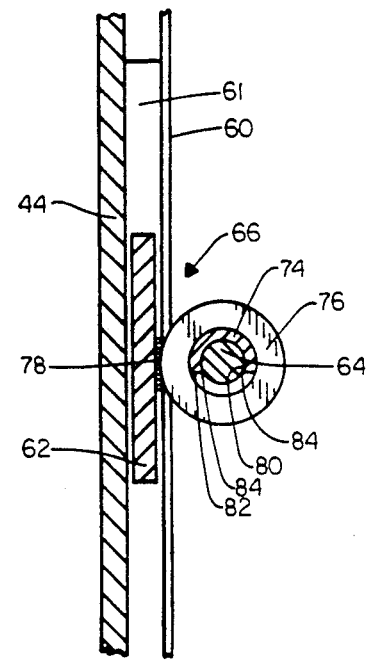
FIG. 6 is a sectional view of the drive mechanism taken along lines 6—6 of FIG. 5.

FIGS. 5 and 6 illustrate in detail the structure of the connection means 66. The connection means 66 comprises a slotted nut 74 journaled onto the threaded shaft 64. The nut 74 mounts a collar 76 around the periphery of the nut and secured thereto by conventional means, for example, set screws 77. The collar 76 is fixedly secured to the slide plate 62 by conventional means. In the embodiment illustrated, the collar 76 is secured to the slide plate 62 by weldment 78.

The nut 74 is slotted so that the internal threads 80 thereof completely encircle the threaded shaft 64 for only a portion of the length of the nut 74. Thus, an open face 82 of the nut 74 is presented along the threads of the shaft 64. As the shaft rotates with respect to the nut 74, a pair of opposed edges 84, each provided by an open face 82 adjacent the shaft threads serves to scrap the threaded shaft 64 clean of dust and debris which tends to accumulate on the shaft and enhance the free movement of the nut along the shaft.

Pivotable movement of the swinging spout 42 is accomplished by causing the motor 70 to rotate the shaft 64 as it is supported in the bearing mounts 68. As the shaft 64 rotates, the connection means 66 is caused to move axially with respect to the shaft either to the right or left as shown in FIG. 2 depending on the direction of rotation of the shaft. As the nut and collar 74, 76 move axially with respect to the shaft, it will be seen that the side plate also moves with respect thereto which causes the swinging spout 42 to rotate about pivot 48. As the slide plate 62 continues to move with respect to the shaft, it slides within the guide channels 61, and simultaneously rotates with respect to the swinging spout 42 to continue to drive the swinging spout to a preselected position with respect to a hopper 22.

Figure 7:
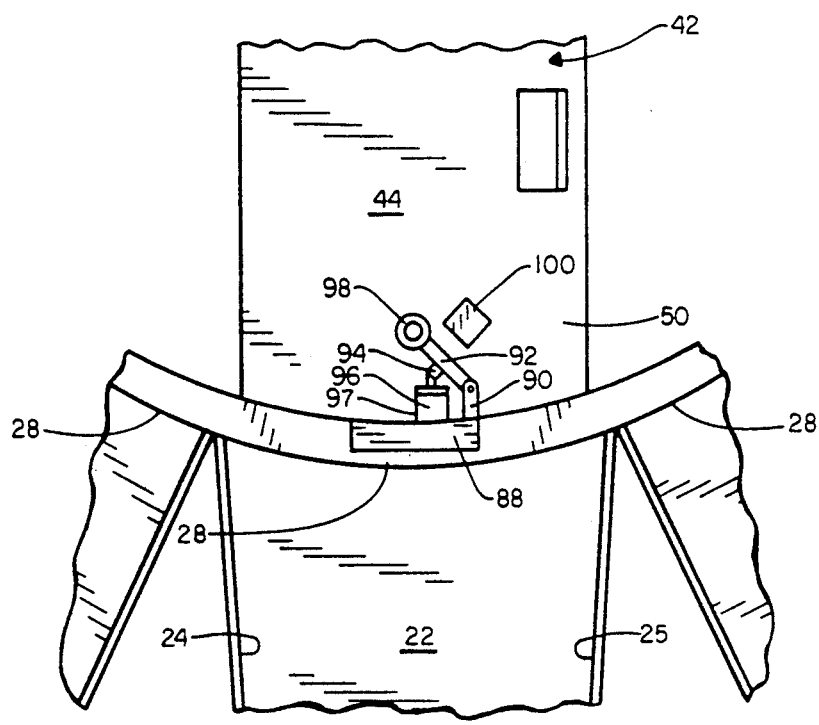
FIG. 7 is a detailed view of the alignment mechanism for each swingable spout.

As the swinging spout 42 pivots with respect to the intake spout 32, it is preferable to position the swinging spout 42 directly over a single hopper 22 so that material transported through the swinging spout 42 will be directed only to a single hopper. The alignment mechanism is best illustrated in FIGS. 3 and 7. It will be seen that a rail 86 conforming generally to the arcuate shape of the edge of the housing 12 in open communication with the hoppers 22 is mounted over the hopper openings 28, with a separate rail 82, 82', 82" corresponding to each respective swinging spout 42, 42', 42". A microswitch 88 is mounted on each rail 82, 82', 82" directly adjacent each hopper opening 28. A support arm 90 extends above each microswitch and a lever 92 is pivotably connected to each support arm 90. A stub 94 projects downwardly from each lever 92 and is adapted to engage a switch arm 96 on each microswitch 88. The switch arm 96 is typically sealed by a protective boot 97 and biased to an open position where the switch 8 is disengaged. A roller 98 is provided at the end of each lever 92. A stub shaft 100 is centrally located at the lower end 50 of each swinging spout 42 on the side wall 44 adjacent the rail 86. As the end 50 of the swinging spout 42 moves past the microswitch 88 adjacent each hopper opening, the stub shaft 100 contacts a roller 98, which in turn causes the lever 92 to rotate downwardly with respect to the support arm 90. The stub 94 is caused to depress the switch arm 96 which engages the microswitch 88 and sends a corresponding signal to a control panel 120 (see FIG. 8). It will be seen that the microswitch 88 is mounted on the rail 86 so that the roller 98 is centrally located over the hopper opening 28. Thus, when the stub shaft 100 projecting from the swinging spout 42 has depressed the roller 98 and the corresponding lever 92 to the maximum limit of its rotation about support arm 90, the microswitch is engaged. Simultaneously, the swinging spout 42 is positioned directly over the adjoining hopper opening 28 and in registry therewith. As the swinging spout 42 passes the adjoining hopper, the microswitch is disengaged.

Figure 8:
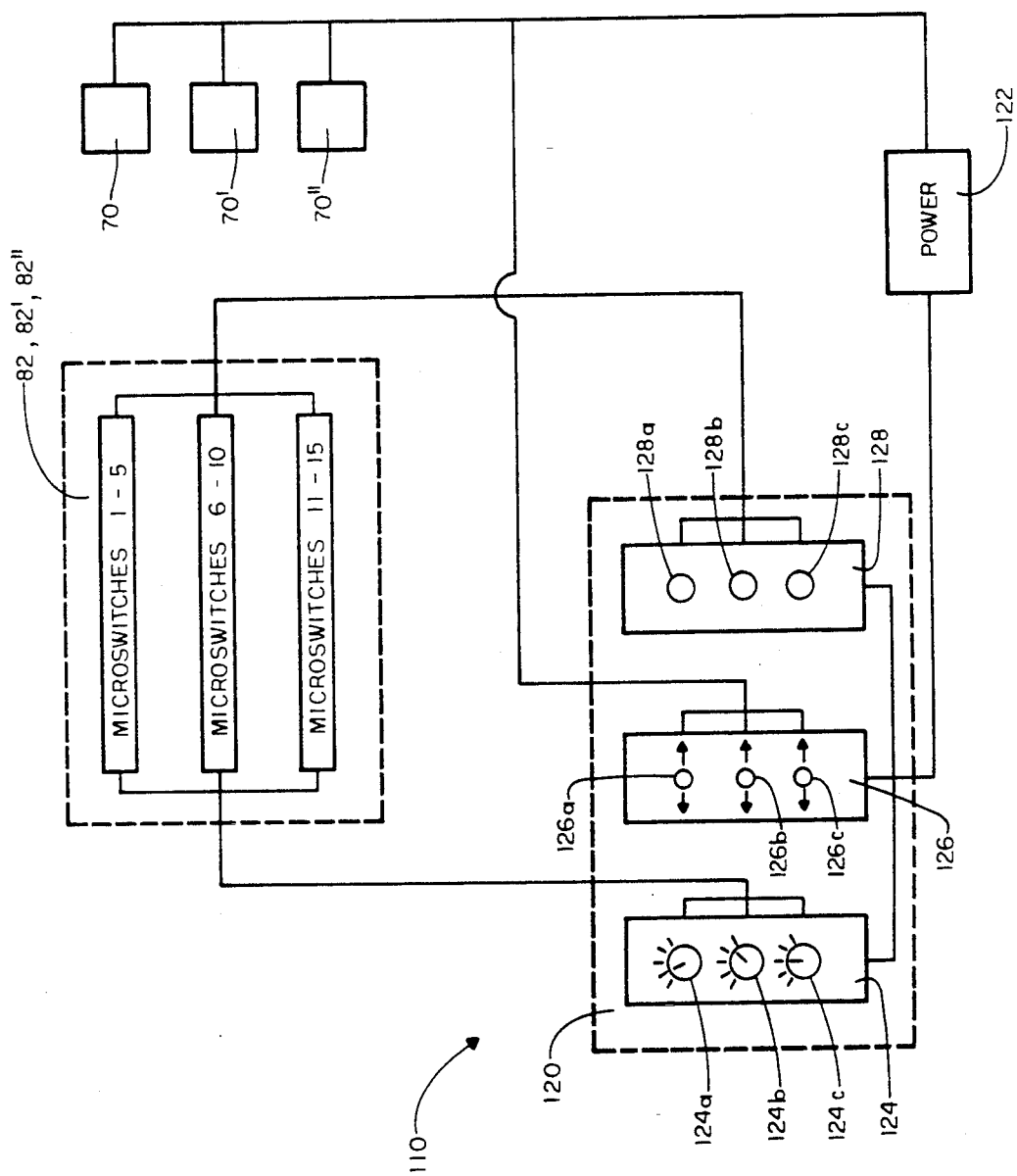
FIG. 8 is a schematic illustration of the electrical control system.

The controller mechanism 110 is best illustrated in the block diagram of FIG. 8. In the embodiment illustrated, each rail 82, 82', 82" contains a bank of microswitches. For convenience, the microswitches are consecutively numbered, with switches one through five mounted to rail 82, switches six through ten mounted to rail 82', and switches eleven through fifteen mounted to rail 82". As presented earlier, each microswitch is associated with a hopper. Thus for example, switches one, six and eleven may correspond to hopper one, switches two, seven and twelve correspond to hopper two, and so forth. The control panel 120 is adapted to receive signals from the microswitches. A conventional power source 122 supplies power to the control mechanism 110. As discussed above, a motor 70, 70', 70" corresponds with the actuation of a spout adjoining each rail 82, 82', 82". Each spout accordingly acts upon a respective bank of microswitches. The control panel 120 comprises a selector switch rank 124, a controlling switch rank 126, and a rank of display lamps 128. Each rank 124, 128 has a single selector switch or lamp corresponding to a bank of microswitches and associated spout. Further, each selector switch 124a, 124b, 124c in the switch rank 124 is adapted to select one of the microswitches in its corresponding microswitch bank. Each controlling switch 126a, 126b, 126c in the switch rank 126 controls the actuation of a respective motor 70, 70', 70". The switches 126 are preferably toggled to enable actuation of the motors 70, 70', 70" in either forward or reverse. Similarly, each lamp 128a, 128b, 128c corresponds to a respective rail 82, 82', 82".

Selection of a given microswitch by the selector switches 124a, 124b, 124c permits the engagement of that microswitch to close a circuit which lights the corresponding lamp in the display 128. The remaining microswitches on the rail are not so enabled. Thus, for example, if the operator wanted to move the spout 42 corresponding to rail 82 to hopper number three corresponding with microswitch number three, the operator would rotate selector switch 124a to select hopper number three. The operator would then deflect toggle switch 126a which would engage motor 70 to cause the spout 42 to rotate. As the spout comes into registry with hopper number three, either from the left or the right, display light 128a will glow indicating that the spout 42 is aligned with hopper number three and accordingly will direct material to that hopper.

It will be apparent that variations of the controller mechanism 110 may be employed. For example, a bank of lamps may be provided corresponding to each rail 82, 82', 82", wherein each lamp corresponds to a single microswitch. As each microswitch is engaged, its corresponding lamp would glow, indicating the position of the spout with respect to the hoppers.

In operation, each swingable spout 42, 42', 42" is positioned above a preselected hopper. If each spout is required to direct material to a different bin, then each spout will be rotated to a position adjacent a different hopper opening 28. If material is to be directed through more than one intake spout to the same hopper, then the swinging spouts 42, 42', 42" will be rotated to the corresponding positions above the respective hopper opening 28. It will be apparent that different materials can simultaneously be directed to respective intake spouts 32. Thus for example, two different materials can be directed through two intake spouts 32 and directed to a single hopper 22, for example hopper number three, where the material will be mixed and directed to a single bin. Simultaneously, a third material may be deposited in the third intake spout 32 and directed to a different hopper and thence to a different bin.

In the embodiment illustrated, the distributor is provided with three intake spouts, and five hoppers. It will be apparent that any number of intake spouts, and any number of discharge hoppers may be provided depending upon the needs of a particular application.

Reasonable variation and modifications are possible within the scope of the foregoing disclosure and drawings without departing from the scope of the invention as defined in the accompanying claims.

The embodiments of the invention in which an exclusive property or privilege is claimed are defined as follows:

1. In a grain distributor comprising a sector-shaped housing having a plurality of outlet openings in the arcuate periphery thereof, the improvement comprising:
    at least two inlet openings in an upper portion of said housing for receiving granular material;
    at least two spouts, each of said spouts having an open upper end and an open lower end; and
    means for independently mounting each of said spouts within said housing for swinging movement of the respective lower ends thereof for registry with each of said outlet openings while maintaining a respective open upper end thereof in registry with one of said inlet openings whereby granular material received in a respective inlet opening of a spout may be directed to a preselected one of said outlet openings.

2. A grain distributor according to claim 1 and further comprising a driving means mounted to said housing and coupled to one of said spouts for moving the lower end thereof independently of another of said at least two spouts and with respect to said outlet openings.

3. A grain distributor according to claim 2 wherein said driving means comprises a rotatable shaft adapted to be connected at one end thereof to a reversible motor and a connection means interconnecting said shaft and said one spout to move said spout axially relative to said shaft when said shaft rotates.

4. A grain distributor according to claim 3 wherein said shaft is threaded and said connection means comprises a nut threaded on said shaft and means for slidably mounting said nut to said spout.

5. A grain distributor according to claim 4 wherein said mounting means comprises a circular plate fixed to said nut and a pair of opposed brackets mounted to said spout, each bracket defining a channel longitudinal of the spout to receive the periphery of said circular plate so that said plate can rotate relative to said spout and slide longitudinally relative to said spout.

6. A grain distributor according to claim 5 wherein said nut includes means forming a pair of opposed axially extending edges transverse to the threads on said shaft to remove debris accumulated on said shaft when said shaft rotates relative to said nut.

7. A grain distributor according to claim 6 further comprising means to indicate when said spout lower ends are in registry with said outlet openings.

8. A grain distributor according to claim 7 wherein said indicator means includes actuator means on said spout lower ends and switch means mounted within said housing and adapted to be actuated by said actuator means when said spout lower end are in registry with said outlet openings.

9. A grain distributor according to claim 8 wherein said switch means comprises a microswitch and a biased lever pivotably mounted thereto, said actuator means being disposed to move said lever when said lower end is in registry with said outlet opening.

10. A grain distributor according to claim 9 wherein said lever has a roller on one end thereof for rolling engagement with said actuator means.

11. A grain distributor according to claim 1 further comprising means to indicate when said spout lower end is in registry with one of said outlet openings.

12. A grain distributor according to claim 11 wherein said indicator means includes an actuator arm on said spout lower end and a switch mounted within said housing in a position to be actuated by said actuator arm and send a signal to a visual indicator when said spout lower end is in registry with said outlet opening.

13. A grain distributor according to claim 12 wherein said switch comprises a microswitch and a biased lever pivotably mounted thereto, said actuator arm being disposed to move said lever when said lower end is in registry with said outlet opening.

14. A grain distributor according to claim 13 wherein said lever has a roller on one end thereof for rolling engagement with said actuator arm.

15. A grain distributor according to claim 1 wherein each of said inlet openings has a conduit extending downwardly thereof and said spout upper ends are pivotably connected to respective ones of said inlet opening conduits.

16. In a grain distributor comprising a sector shaped housing having a plurality of outlet openings in the arcuate periphery thereof, at least one inlet opening in an upper portion of said housing for receiving granular material, and a spout having an upper end and a lower end, the upper end pivotably mounted within said housing for swinging movement of the lower end relative to said outlet openings, the improvement comprising:

a rotatable shaft adapted to be connected to a reversible motor and a connection means interconnecting said shaft and one of said spouts to move said spout axially relative to said shaft when said shaft rotates.

17. A grain distributor according to claim 16 wherein said shaft is threaded and said connection means comprises a nut threaded on said shaft and means for slidably mounting said nut to said spout.

18. A grain distributor according to claim 17 wherein said mounting means comprises a circular plate fixed to said nut and a pair of opposed brackets mounted to said spout, each bracket defining a channel longitudinal of the spout to receive the periphery of said circular plate so that said plate can rotate relative to said spout and slide longitudinally relative to said spout.

19. A grain distributor according to claim 18 wherein said nut includes means forming a pair of opposed axially extending edges transverse to the threads on said shaft to remove debris accumulated on said shaft when said shaft rotates relative to said nut.

20. In a grain distributor having at least one inlet opening, a plurality of outlet openings, spout means to direct granular material from said inlet opening to said outlet openings, and drive means to move said spout means relative to said outlet openings, the improvement comprising:

said drive means including a rotatable threaded shaft and a nut threaded on said shaft and adapted to move axially relative to said shaft when one of said shaft and said nut are rotated relative to the other, said nut being further fixedly mounted to said spout means.

21. A grain distributor according to claim 20 wherein said nut includes means forming a pair of opposed axially extending edges transverse to the threads on said shaft to remove debris accumulated on said shaft when said shaft rotates relative to said nut.

* * * * *